US012162730B2

(12) United States Patent  
Mayer

(10) Patent No.: US 12,162,730 B2  
(45) Date of Patent: Dec. 10, 2024

(54) STRUCTURAL FRAME FOR A CRANE AND SIMILAR MACHINES, AND CRANE COMPRISING SUCH A STRUCTURAL FRAME

(71) Applicant: Liebherr-Werk Biberach GmbH, Biberach an der Riss (DE)

(72) Inventor: Joachim Mayer, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 1179 days.

(21) Appl. No.: 16/700,906

(22) Filed: Dec. 2, 2019

(65) Prior Publication Data  
US 2020/0102194 A1 Apr. 2, 2020

Related U.S. Application Data

(63) Continuation of application No. PCT/EP2018/064153, filed on May 30, 2018.

(30) Foreign Application Priority Data

May 31, 2017 (DE) .......................... 202017103274.4  
Jul. 6, 2017 (DE) .......................... 202017104032.1

(51) Int. Cl.  
B66C 23/62 (2006.01)  
B33Y 80/00 (2015.01)  
(Continued)

(52) U.S. Cl.  
CPC .............. B66C 23/62 (2013.01); B33Y 80/00 (2014.12); B66C 23/64 (2013.01); E02F 3/34 (2013.01);  
(Continued)

(58) Field of Classification Search  
CPC ....... E02F 3/34; E02F 3/38; E02F 9/08; E02F 9/14; B66C 23/62; B66C 23/64; B33Y 80/00; B66F 9/08  
See application file for complete search history.

(56) References Cited

U.S. PATENT DOCUMENTS 4,425,048 A * 1/1984 Kamohara .............. B66C 23/64  
403/272  
4,489,659 A 12/1984 Kamohara et al.  
(Continued)

FOREIGN PATENT DOCUMENTS

CN 102493651 6/2012  
DE 4123185 1/1992  
(Continued)

Primary Examiner — Adriana Figueroa  
(74) Attorney, Agent, or Firm — Levine Bagade Han LLP

(57) ABSTRACT

The present invention relates to a structural frame of a crane, lifting device, material handler or a similar machine, comprising at least one elongate structural-frame strut. The invention also relates to such a machine comprising such a structural frame. According to a first aspect, it is proposed not to weld or screw a separate doubled panel or separate retaining lugs to the structural-frame element as a reinforcement, but rather to provide the structural-frame strut with integrally formed, seam-free reinforcement layers in the required, highly loaded region, in order to achieve an organically produced increase in wall thickness and/or cross section in a smooth and harmonious manner. These reinforcement layers are produced using 3D printing.

26 Claims, 9 Drawing Sheets

(51) Int. Cl.
*B66C 23/64* (2006.01)
*E02F 3/34* (2006.01)
*E02F 3/38* (2006.01)
*E02F 9/08* (2006.01)
*E02F 9/14* (2006.01)
*B66F 9/08* (2006.01)

(52) U.S. Cl.
CPC ............... *E02F 3/38* (2013.01); *E02F 9/08* (2013.01); *E02F 9/14* (2013.01); *B66F 9/08* (2013.01)

(56) References Cited

U.S. PATENT DOCUMENTS

| | | | | |
|---|---|---|---|---|
| 4,989,774 | A * | 2/1991 | Stephen | B64C 1/06 29/889.72 |
| 5,269,585 | A * | 12/1993 | Klages | B62D 29/008 296/205 |
| 6,389,697 | B1 * | 5/2002 | Benoit | B62D 27/023 219/617 |
| 6,696,174 | B2 * | 2/2004 | Cercone | B23P 6/00 428/626 |
| 6,786,233 | B1 * | 9/2004 | Anderson | F16L 11/083 141/387 |
| 7,568,253 | B2 * | 8/2009 | de la Chevrotiere | E01D 6/00 14/14 |
| 7,882,586 | B2 * | 2/2011 | de la Chevrotiere | E01D 6/00 14/14 |
| 8,505,184 | B2 * | 8/2013 | Pirri | E04G 21/0436 29/453 |
| 9,290,363 | B2 * | 3/2016 | Munuswamy | B66C 23/04 |
| 9,352,515 | B2 * | 5/2016 | Pirri | B29C 53/587 |
| 9,702,137 | B2 * | 7/2017 | Larsen | E04B 1/585 |
| 9,765,547 | B2 * | 9/2017 | Larsen | E04H 12/10 |
| 9,975,179 | B2 * | 5/2018 | Czinger | G06F 30/17 |
| 10,183,706 | B2 * | 1/2019 | Miller | E04B 1/1909 |
| 10,286,961 | B2 * | 5/2019 | Hillebrecht | B22F 10/25 |
| 10,465,378 | B2 * | 11/2019 | Schaefer | B64D 11/0023 |
| 2009/0223093 | A1 * | 9/2009 | Willaredt | E02F 3/301 37/403 |
| 2019/0316368 | A1 * | 10/2019 | Akkoc | B66C 23/64 |

FOREIGN PATENT DOCUMENTS

| | | | |
|---|---|---|---|
| DE | 10258179 | 6/2004 | |
| DE | 10258179 A1 * | 6/2004 | ............ B66C 23/64 |
| DE | 102010048057 | 4/2012 | |
| DE | 202017000487 U1 | 4/2017 | |
| EP | 1640511 A1 * | 3/2006 | ............... E02F 3/38 |
| EP | 2039498 | 3/2009 | |
| EP | 2371756 | 10/2011 | |
| EP | 2371756 A2 * | 10/2011 | ............ B66C 23/66 |
| EP | 2860146 | 4/2015 | |
| EP | 2860146 A1 * | 4/2015 | ............ B66C 23/70 |
| WO | WO 2012/114190 | 8/2012 | |
| WO | WO 2013/078919 | 6/2013 | |
| WO | WO 2015/103223 | 7/2015 | |
| WO | WO 2017/017450 | 2/2017 | |
| WO | WO 2018/011271 | 1/2018 | |
| WO | WO 2018/219993 | 12/2018 | |

* cited by examiner

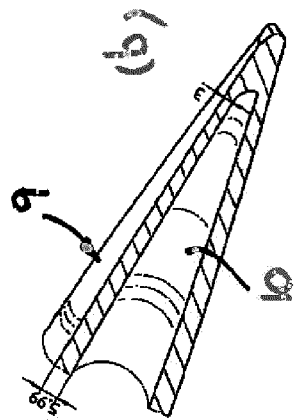
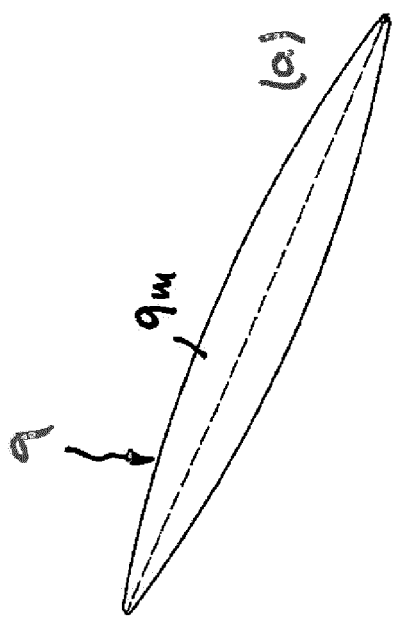
Fig. 5

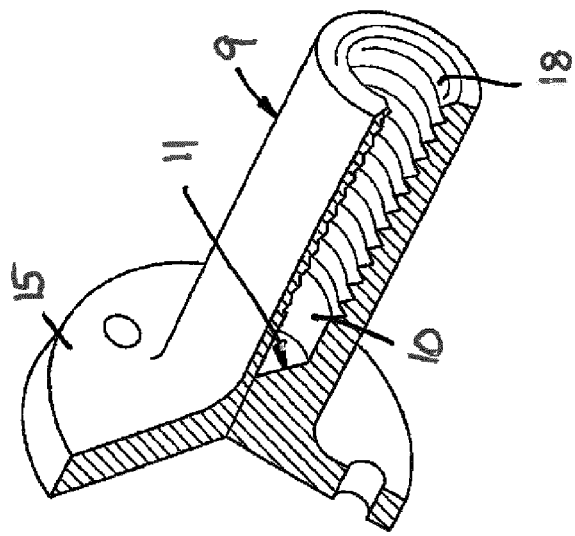
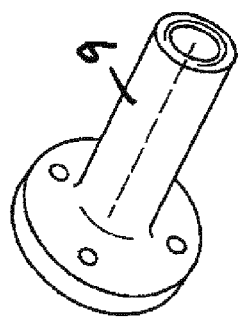
Fig. 7

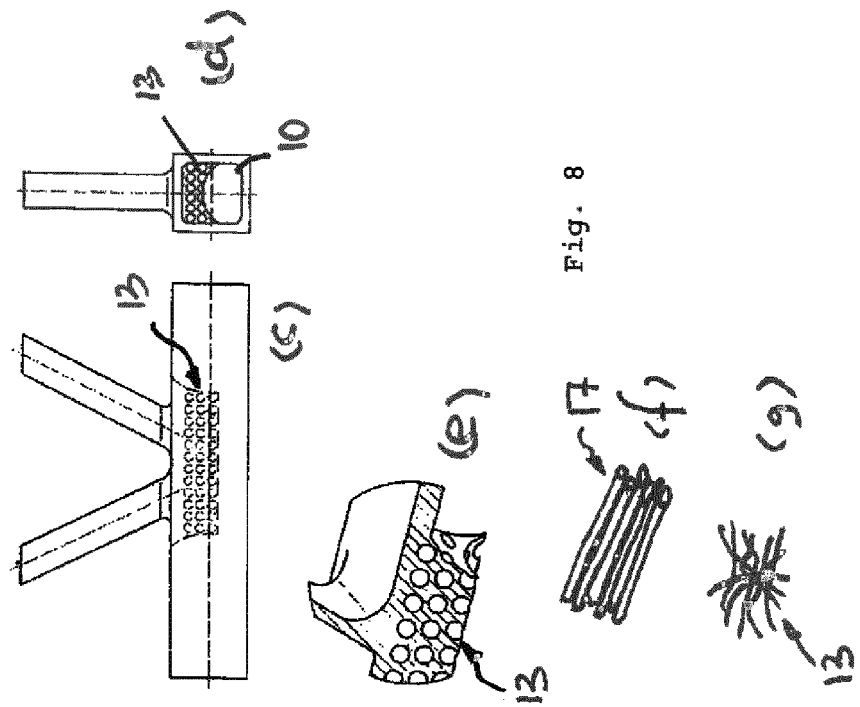
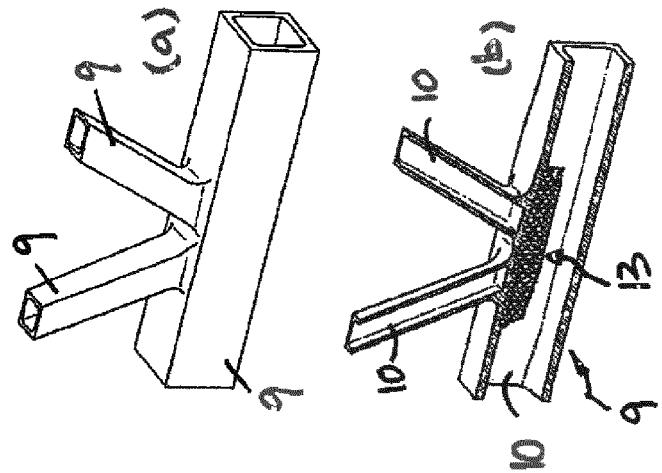
Fig. 8

STRUCTURAL FRAME FOR A CRANE AND SIMILAR MACHINES, AND CRANE COMPRISING SUCH A STRUCTURAL FRAME

CROSS-REFERENCE TO RELATED APPLICATIONS

This application is a continuation of International Application No. PCT/EP2018/064153, filed May 30, 2018; which claims priority to German Utility Model No. 20 2017 103 274.4, filed May 31, 2017; and German Utility Model No. 20 2017 104 032.1, filed Jul. 6, 2017, all of which are incorporated by reference herein in their entireties.

BACKGROUND

The present invention relates to a structural frame of a crane, lifting device, material handler or a similar machine, comprising at least one elongate structural-frame strut. The invention also relates to such a machine comprising such a structural frame.

In highly loaded structural frames of machines such as cranes, in which the dead weight is more significant, up to now it has often only been possible to partially fulfil the divergent requirements of a lightweight construction on one hand and sufficient, safety-reliable strength on the other hand. Since the safety-relevant strength is the highest priority, structural-frame components are designed for the highest loads by adding safety measures, which, in less loaded structural-frame portions, regularly results in over-dimensioning and thus increased component weight. In particular, it is often the case that the peak load that is decisive for the component design only occurs in certain portions of the structural frame, while considerably lower forces or stresses act in other structural-frame portions.

In these less highly loaded structural-frame portions, the structural-frame elements per se could be dimensioned so as to be lighter without the strength or safety being compromised. However, component dimensioning of this type that differs in different regions is difficult to produce in manufacturing, in particular if the structural frame is intended to be manufactured from a metal material, in particular steel, due to the required strength together with limited material costs at the same time.

For cranes such as tower cranes or port cranes, or construction machines such as cable excavators, truss constructions which are composed of elongate structural-frame struts in the form of longitudinal flanges and truss struts have predominantly become established as structural frames. In this case, at least some of the structural-frame struts may be designed as a hollow profile at least in part in order to achieve high flexural rigidity and buckling resistance with relatively lightweight profiles; however, solid-material struts may also be used in order to achieve higher strengths. In other types of crane, such as telescopic cranes, telescopic sections that have a relatively large volume in cross section and may be rolled or bent at the edge and welded together are known as structural frames, with it being possible to weld reinforcing metal sheets to the telescopic-section collars. Similar structural-frame struts in the form of sheet-metal profiles are, for example, also known as support struts of extendable supports on the undercarriages of construction machines, which usually consist of elongate beam profiles.

In order to adjust the structural-element cross sections to the loads that are actually acting, at least to some extent, it is known to double up more highly loaded portions of the structural-frame struts, for example to weld reinforcing metal sheets thereto, to rivet reinforcements thereto, or to screw on reinforcements such as buckling-resistant strips. In addition, connecting lugs are often welded to the ends of the truss struts to produce bolting points.

SUMMARY

Proceeding therefrom, the problem addressed by the present invention is to provide an improved structural frame of the type mentioned at the outset and an improved crane comprising such a structural frame which avoid the drawbacks of the prior art and develop the prior art in an advantageous manner. In particular, improved adjustment of the component structure to the load occurring during operation is intended to be achieved, in order to obtain a lighter construction together with reliably sufficient strength.

The stated problem is solved by a structural frame, by a machine and by a crane comprising such a structural frame.

According to a first aspect, it is thus proposed not to weld or screw a separate doubled panel or separate retaining lugs to the structural-frame element as a reinforcement, but rather to provide the structural-frame strut with integrally molded-on, seam-free reinforcement layers in the required, highly loaded region, in order to achieve an organically produced increase in wall thickness and/or cross section in a smooth and harmonious manner. According to the invention, the structural-frame strut has at least one integrally formed, layered reinforcement portion. This reinforcement portion formed by layer manufacturing may in particular be manufactured by means of 3D printing or stereolithography, but in principle can also be manufactured in other additive construction processes, such that the reinforcement layers are integrally connected to one another and rest of the body of the structural-frame strut.

In particular, the layered reinforcement portion may be formed from a metal material, with it being possible for the rest of the body of the structural-frame strut to be formed from the same or a different metal material. The reinforcement portion may be constructed from metal layers in a 3D printing process, a stereolithography process or another additive construction process. In elements that are less highly loaded, plastics layers may also be used, with it also being possible for a layered structure containing different layered materials to be provided.

Advantageously, the structural-frame strut may be formed at least in portions as a hollow profile, with it being possible for the at least one layered reinforcement portion to be molded onto the portions that require increased strength in a targeted manner. This makes it possible to obtain a very light component which nevertheless has sufficient strength when using the material. Here, the layered reinforcement portion may be molded in the inside of and/or on the outside of the hollow profile.

The structural-frame strut may, however, also be formed as a solid-material strut, with it being possible for the layered reinforcement portion to be molded on the outside of the solid-material portion in this case.

According to another aspect of the present invention, the structural-frame strut may have organic and/or bionic contouring, which, in a deviation from the standard mathematical main bodies such as cylinders, cones or plates, may have gradually changing curvatures and/or gradually changing wall thicknesses and/or gradually changing cross-sectional dimensions. Advantageously, such organic and/or bionic contours of the structural-frame strut may be constructed in layers, in particular manufactured using 3D printing, with it being possible to produce asymmetrical curvatures and contours as well as asymmetrical thickened portions and/or thickened portions that are only provided in regions.

In particular, the structural-frame strut may be designed, at least in the region of the reinforcement portion, as a freeform element having a continuously and constantly changing or gradually harmoniously changing wall thickness. By means of such freeform surface contouring of the inner and/or outer walls of the structural-frame strut with preferably harmonious, gradual contour transitions between different, multi-axially curved surface portions, excellent adaptation to the flow of forces within the component and the component loads that occur can be achieved without there being overdimensioning in the regions that are less highly loaded and strength-related problems in the portions in which peak loads are acting.

In this case, the bionic freeform surface contouring may relate to individual structural frame elements or struts, but may also be applied to the entire structural frame or at least a portion of the structural frame. For example, a truss girder, such as a crane boom, a crane tower or a cable excavator, may comprise individual truss struts which have contoured inner and/or outer surfaces in the form of freeform surfaces in the above-mentioned manner. Alternatively or additionally, however, the entire boom or structural frame may have organic freeform surface contouring.

In particular, in a deviation from previous booms, the enveloping surface of which usually forms a cuboid or a triangular prism, an enveloping surface surrounding the truss girder may have, when viewed in cross section, a uniaxial or multi-axial curvature and/or a cross-sectional dimension that changes along the longitudinal extension, with it being possible for different curvature progressions to be provided in different longitudinal-sectional planes and for the cross-sectional dimension to change continuously, gradually and therefore harmoniously when viewed over the longitudinal extension. For example, such a truss boom, when viewed in a horizontal longitudinal-sectional plane and/or in a vertical longitudinal-sectional plane, may have a harmonious, convex enveloping-surface contour, such that the cross section of the boom harmoniously tapers towards both ends from a maximum cross-sectional dimension in a central portion, with it being possible for a cross-sectional increase, for example in the form of a thickened portion of the boom, to be formed, when viewed at end portions of the boom, such that the outer enveloping contour of the boom approximately resembles a bone, on which a thickened joint portion is formed at the ends.

Alternatively or additionally, a tower of a rotating tower crane, which may be designed as a truss boom, may, in its cross-sectional dimension and so as to be adapted to its load, be thickened in the foot region of the boom and may taper again upwards towards the attachment point of the boom and may optionally have another thickened portion immediately in the region of the boom attachment point, such that the outer enveloping contour of the crane tower also has bone-like, organic contouring. In this case, a sectional contour of the enveloping surface having different characteristics may optionally be provided in different sectional planes, with it being possible to provide a thicker, convex enveloping-surface contour in a vertical longitudinal-sectional plane than in a vertical sectional plane that is perpendicular thereto.

When viewing horizontal cross-sectional planes of the crane tower, the truss enveloping surface may be oval or elliptical and may have a longer main axis in a vertical sectional plane containing the crane boom. Alternatively or additionally, the main axes of the cross-sectional contour of the enveloping surface may vary to different degrees in cross- sectional planes at different heights over the crane tower. For example, a transverse axis, transversely to the vertical plane through the boom, when viewed over the height of the tower, may remain substantially the same or may only change slightly, for example may increase towards the center, while the main axis of the cross-sectional profile, in parallel with the vertical sectional plane through the boom, may change to a relatively great extent over the height of the tower, for example may increase towards the center and/or decrease towards the end portions.

Depending on the machine type and the loading circumstances, different enveloping-surface contouring may be advantageous here.

In a development of the invention, however, individual structural frame portions, in particular elongate structural-frame struts, may in particular also have special contouring and/or wall-thickness progressions and/or reinforcement portions. In an advantageous development of the invention, a reinforcement portion may in particular be provided in the interior of the hollow-profile portion of a structural frame element, with such a reinforcement portion in the hollow profile advantageously being integrally molded onto the hollow-profile wall and/or being able to be formed in a layered construction, for example manufactured using 3D printing.

In particular, such a reinforcement portion may comprise a honeycomb structure and/or a tubular-bone structure that is inside the hollow profile, with it being possible for such a honeycomb structure and/or tubular-bone structure to advantageously be made of a metal material and to be integrally molded onto the hollow-profile wall of the structural-frame strut.

Alternatively or additionally, a reinforcement portion may also comprise a branched structure that is preferably inside a hollow-profile portion of the structural-frame strut and comprises irregularly shaped and/or irregularly arranged branched struts. Such a birds-nest type of branching of reinforcement struts inside a hollow profile can significantly increase the buckling resistance and flexural rigidity thereof, with it being possible for the branching struts to advantageously extend in different directions and/or to have a curved, optionally also irregular contour progression. Alternatively or additionally, such branching struts may also have a cross-sectional dimension that changes continuously, in particular gradually, over its longitudinal extension, for example may thicken towards the ends at which they are molded onto the hollow profile. In this case, the branching struts may be formed as solid-material struts or even as hollow-profile struts, and changing wall thicknesses may optionally be provided.

Alternatively or additionally, as a reinforcement portion, a cloud structure and/or sponge structure in which the material forming the reinforcement structure is irregularly perforated, as is known in a sponge or even cheese, may also preferably be provided in the inside of a hollow-profile portion of the structural-frame strut. Advantageously, such a cloud structure and/or sponge structure may be made of a metal material and may be integrally molded onto the rest of the body of the structural-frame strut. Alternatively or additionally, said cloud structure and/or sponge structure may be constructed in layers.

Alternatively or additionally to reinforcement portions arranged in the inside of a hollow-profile portion, the structural-frame strut may also comprise outer reinforcement portions which may advantageously be integrally molded on and constructed in layers. For example, buckling-resistant strips extending in the longitudinal direction of the strut may be molded onto the outside at points at risk of buckling.

Alternatively or additionally, the structural-frame strut may comprise connecting portions for connection to other structural frame elements at opposite ends, the structural-frame strut advantageously having a cross-sectional dimension that preferably continuously and constantly changes, in particular gradually changes, and/or a wall thickness that preferably continuously and constantly changes, in particular gradually changes, at least in a central portion between the two connecting portions. For example, the structural-frame strut may have a relatively high or maximum wall thickness in a central portion, which may then continuously decrease, starting from the central portion, towards the two opposite ends, it being possible for a thickened portion or increasing wall thickness to then be provided at the end portions of the structural-frame strut, by means of which the structural-frame strut transitions smoothly and harmoniously into the reinforced connecting portions.

Said connecting portions in the end regions of the structural-frame strut may for example be designed as solid-material portions, while a central portion of the structural-frame strut may be designed as a hollow profile. Irrespective of the position and/or function of the solid-material portions, the structural-frame strut may thus advantageously be characterized by a combination of hollow profiles and solid-material portions.

When the structural frame forms a truss and said structural-frame strut forms a truss strut in the form of a longitudinal flange or a cross member, it may be provided in an advantageous development of the invention that said truss strut is connected in an integral and seam-free manner to other truss struts of the truss. The truss struts are thus not screwed or welded to one another, but instead have a transition made of homogeneous material, such that the next strut appears to grow out of the base strut.

Alternatively or additionally to partially different and/or continuously varying wall thicknesses, cross-sectional dimensions or numbers of layers, in a development of the invention, the structural-frame strut may also have partially different material characteristics, in particular may be constructed from different materials and/or materials having different characteristics at different strut portions, in order to achieve different component properties at different strut portions. In particular, different layers may consist of different materials and/or may consist of materials having different strengths and/or different material properties. For example, a layer made of a higher-strength material may be provided in a more highly loaded region of the strut and a layer made of a material having a comparatively lower strength may be provided in a less highly loaded strut region.

Alternatively or additionally, however, individual material layers may be designed to be different in part, in particular to be constructed from different materials and/or identical materials but having different material properties. For example, an annular material layer may be made of a higher-strength material in a first sector and, in a second, for example opposite, sector of the annular layer, may be made of a material having a comparatively lower strength. If a linear material layer is viewed, for example a material layer extending in the longitudinal direction of the strut, said material layer may for example consist of a different material at an end portion than at an opposite end portion, or a central portion may be formed by a lower-strength material while the same layer consists of a higher-strength material at its end portions.

Alternatively or additionally to using partially different material strengths, other material properties may also partially vary, however, for example more corrosion-resistant layers and/or softer, more flexible and/or more resilient layers on one hand and harder, less resilient and/or more rigid material layers on the other hand. Here too, the material properties may vary from layer to layer, but different material properties may also be provided within the same layer.

Advantageously, the partially different material properties or the strut portions having different material properties of this kind are integrally molded onto one another and/or are bonded to one another.

BRIEF DESCRIPTION OF THE DRAWINGS

The invention is explained in greater detail in the following on the basis of preferred embodiments and the associated drawings, in which:

FIG. 5 is a perspective view of a structural-frame strut in the form of a pressure rod, the cross-sectional dimension of which tapers from a maximum diameter in the center of the rod towards the ends, with the view (a) being an outer view and the view (b) being a partial sectional view for illustrating the hollow profile, FIG. 7 is a perspective view of a structural-frame strut in the form of a flange element comprising a screw-thread neck, with the view (a) being an outer view and the view (b) being a sectional view for illustrating the progression of the wall thickness, FIG. 8 is a view of details of the node point between multiple truss struts of the structural frame of the crane in FIG. 1, with the view (a) being a perspective outer view, the view (b) being a longitudinal section for showing the honeycomb stiffening structure inside the truss strut, the view (c) being a side view, the view (d) being a cross section, the view (e) being a sectional view of an enlarged detail of the honeycomb structure, the view (f) being a tubular-bone structure and the view (g) being a branched structure.

DETAILED DESCRIPTION

Figure 1:
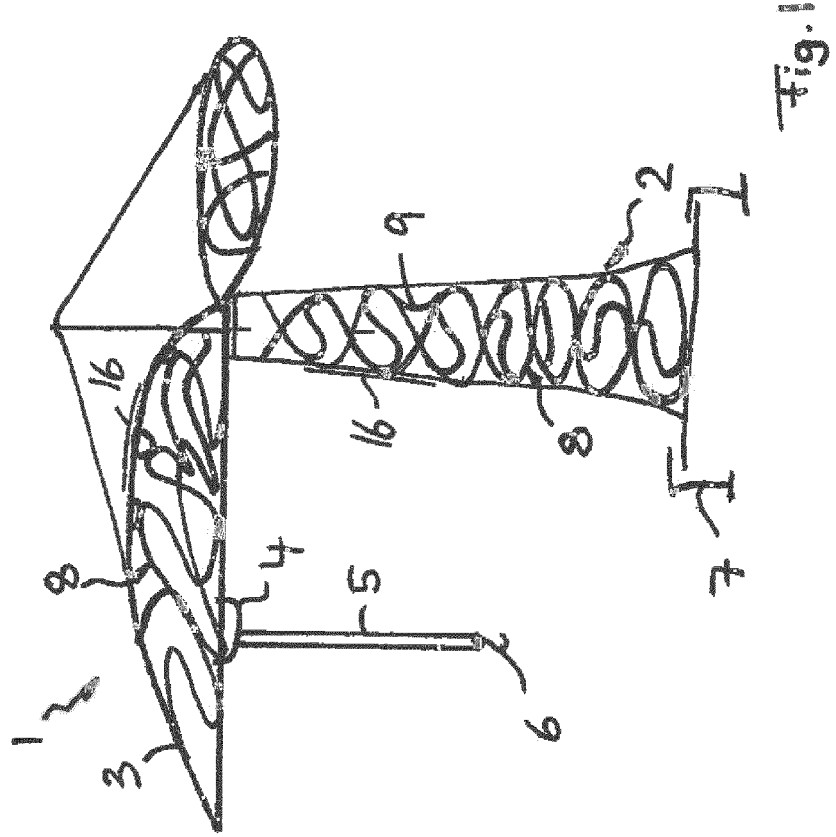
FIG. 1 is a schematic side view of a rotating tower crane comprising an organically constructed structural frame, comprising a truss tower and a truss boom comprising structural- frame struts with bionic contouring.

As shown in FIG. 1, the structural frame 8 according to the invention is part of a crane 1 and can form the boom 3 and the tower thereof, where the crane is designed as a rotating tower crane. It is noted, however, that the structural frame may also be part of other comparable machines having highly loaded structures, with it being possible for such other machines to be a cable excavator, a leader, a lifting device such as a wheel loader or a material handler such as an excavated-material conveyor or a construction machine, for example.

As FIG. 1 also shows, the structural frame 8 may in particular be designed as a truss or truss girder, but the structural frame may also comprise other structural frame components, such as the outrigger 7 of the crane.

As shown in FIG. 1, the crane 1 may be designed as a rotating tower crane which comprises an upright tower 2 that supports an approximately horizontally extending boom 3 and optionally a counter-boom. A hoist rope 5 can be lowered from the approximately horizontally extending boom 3, which rope has a load hook 6, it being possible for the hoist rope 5 to extend from a crane trolley 4 that can be moved along the boom 3.

When viewed as a whole, the structural frame 8 in the form of the tower 2 and/or boom 3 may have organic and/or bionic contouring. For example, in a deviation from previous, conventional tower and/or boom enveloping surfaces, an enveloping surface surrounding the tower 2 and/or an enveloping surface 16 enclosing the boom 3 may have curved outer contouring, which may have an arcuate curvature when viewed in either longitudinal direction. For example, the tower 2 and/or its enveloping surface 16 may have slightly pear-shaped or slightly spherical outer contouring. The enveloping surface 16 of the boom 3 may comprise a planar base surface, along which the crane trolley 4 can be moved, as well as an arcuately curved rear surface; cf. FIG. 1. The cross section of the enveloping surfaces 16 of the tower 2 and/or the boom 3 may vary in terms of shape and dimensions here, as has been explained in greater detail at the outset. For example, the enveloping surface 16 of the tower 2 at the foot and/or the shoulder thereof may be somewhat more circular in cross section, while in a central portion of the tower the enveloping surface 16 may have more elliptical or oval cross-sectional contouring.

Alternatively or additionally to such organic enveloping surfaces, the structural frame 8 may also comprise organically and/or bionically contoured structural-frame struts 9 in the form of longitudinal flanges and/or cross members which may in principle have straight longitudinal extensions, but may also have curved progressions of the longitudinal axis, with it being possible for said structural-frame struts 9 to also be multi-axially curved and/or to have radii of curvature that change multiple times and/or gradually changing radii of curvature when viewed along the longitudinal extension thereof.

As shown in greater detail in FIGS. 2 to 9, the structural-frame struts 9 of the structural frame 8 may have partially different or varying wall thicknesses, cross-sectional dimensions or material characteristics in order to adapt the relevant structural-frame component as optimally as possible to the relevant load and the resulting flows of force and diffusion of stresses. In particular, the parts of the structural frame may comprise partial reinforcement portions 11 which may have a layered construction and may be integrally molded onto the rest of the body of the structural frame element in a seam-free and planar manner.

Irrespective of locally varying, in particular organically contoured strut and/or layer geometries, partially different material properties may however also be implemented, in particular locally increased material strength and/or locally increased corrosion resistance and/or locally varying elasticity and/or flexibility. This may, for example, be obtained by layers of different materials, or also by layers of materials that are identical but have different material properties, for example due to different melting processes, melting points or irradiation temperatures, irradiation intensities and/or irradiation durations. Alternatively or additionally, however, different materials may also be used within the same printed layer, for example a harder material may be used in one portion of the same layer and a softer material may be used in another portion of the layer.

In particular, the following local adaptations can be made to the material properties and/or materials in the printing process:

higher material strengths at the bearing stresses of holes, in order to make it possible to absorb high contact stresses (bearing stresses) and to nevertheless maintain the toughness of the surrounding material higher material strengths of the entire bolt eye, in order to keep the geometry of the eye as compact as possible production of corrosion-resistant surfaces, e.g. in holes that cannot be protected by anti-corrosive coatings, in particular if there is movement between the connecting elements in the event of load changes production of corrosion-resistant surfaces in regions in which component movements take place but the surfaces cannot cost-effectively be rendered corrosion-resistant using other measures (e.g. friction bearings)

production of corrosion-resistant surfaces in regions in which wheels move and alternative anti-corrosion measures are complex or not durable production of less rigid but resilient regions at points at which there are cross-sectional changes and the resulting notch effect reduces the structural durability of the components production of wear-resistant surfaces only where they are needed, e.g. on the raceway of rollers on boom elements over which crane trolleys pass.

Alternatively or additionally to such partially varying material properties, however, locally varying strut properties can also be obtained by the number and/or the progression and/or the geometry of the material layers locally changing and/or strut geometries being varied, in particular organically and/or continuously varied, in cross section and/or longitudinal section.

Figure 2:
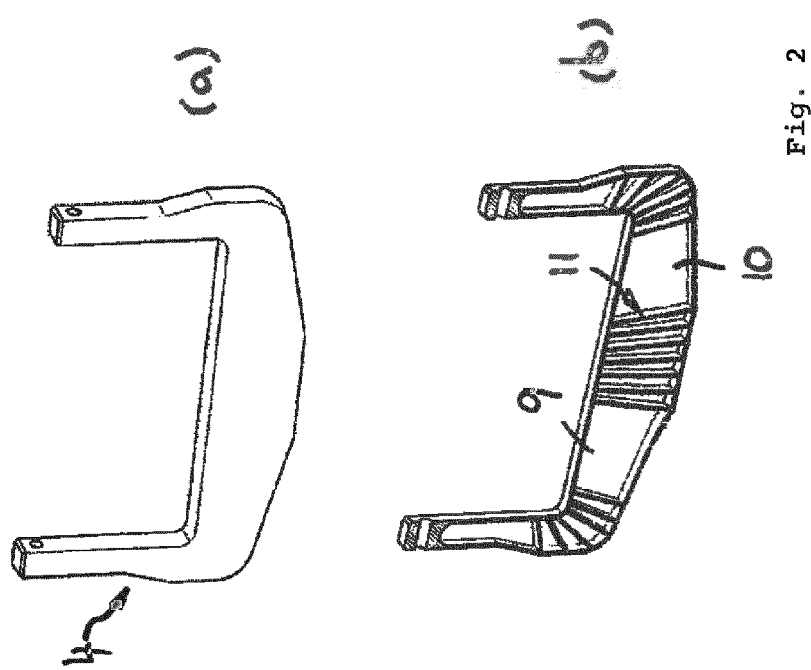
FIG. 2 shows a structural-frame strut according to an advantageous embodiment of the invention in the form of a crane-trolley support of the crane trolley of the crane from FIG. 1, with the view (a) being a perspective outer view of the crane-trolley support and the view (b) being a perspective sectional view of the crane-trolley support which shows the reinforcement structures provided inside the crane-trolley support.

For example, FIG. 2 shows a structural frame element 9 of the crane trolley 4 of the crane 1 from FIG. 1, with said structural frame element 9 having approximately U-shaped contouring when viewed as a whole. In this case, the structural frame element 9 may be designed as a hollow profile 10 at least in portions. In the particularly highly loaded transition and unwinding portions between the legs and in the central region of the central leg, reinforcement portions 11 may be formed in the inside of the hollow profile 10, which may for example be in the form of reinforcement ribs and/or a tube profile. Advantageously, the structural frame element 9 of the crane trolley 4 may be manufactured from a metal material using 3D printing, such that the reinforcement portions 11 are constructed in layers in the inside of the hollow profile 10.

Figure 3:
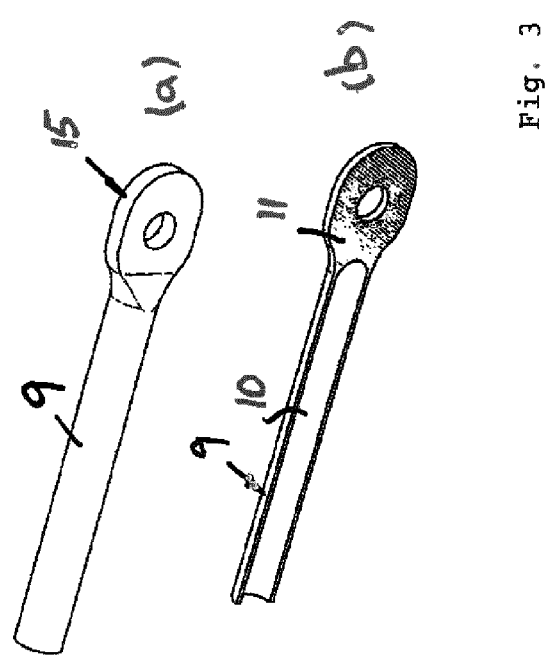
FIG. 3 is a perspective partial view of a structural-frame strut which comprises a hollow profile and an articulation eye formed therein, with the view (a) being a perspective outer view and the view (b) being a longitudinal section for showing the inner workings.

As shown in FIG. 3, a structural-frame strut 9 may also have an approximately straight longitudinal extension and have a connecting portion 15 at at least one end for connection to other structural frame elements. Such a connecting portion 15 may for example be in the form of a molded-on bolt eye or a flange eyelet, with it being possible for said connecting means 15 to be integrally molded onto the hollow profile 10 of the structural frame element in a seam-free manner. As shown in FIG. 3, the structural frame element may comprise both hollow-profile portions and solid-material portions, with the transitions between the solid-material portions and the hollow-profile portions advantageously being designed to be harmonious and gradual, in particular due to a rounded transition of the hollow-profile wall into the solid-profile portion.

In the region of said reinforcement portion 11, which may form a solid-material portion, layers of higher-strength material may be formed in order to achieve higher strengths specifically in the region of the connecting means.

Figure 4:
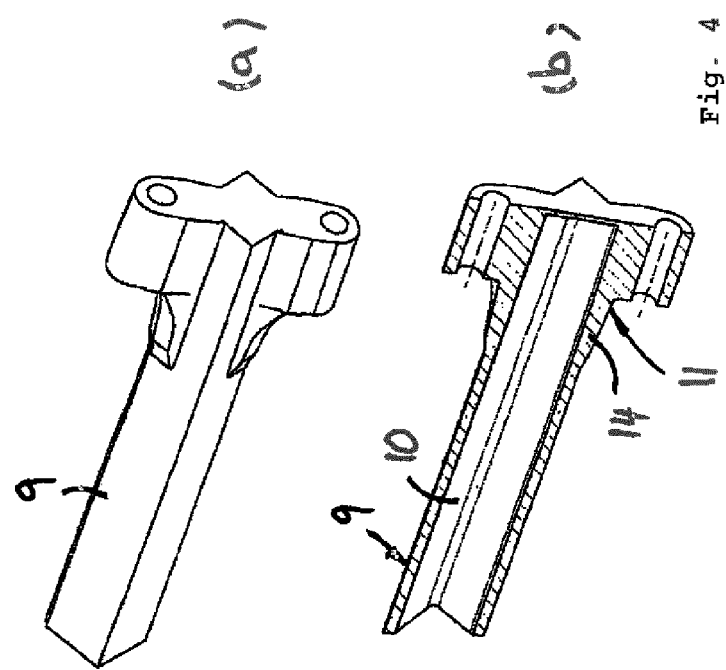
FIG. 4 is a perspective partial view of a structural-frame strut comprising a screw-connection end, with the view (a) being a perspective outer view and the view (b) being a perspective section for illustrating the changing wall thicknesses.

As shown in FIG. 4, a structural-frame strut 9 may have not only circular or rounded cross-sectional profiles, but also a hollow profile 10 having an angular and/or polygonal cross section.

The wall of the hollow profile 10 gradually transitions, towards the connecting portion 15, into the solid-material portion of said connecting portion 15. In particular, a reinforcement portion 13 may have a thickened portion 14 in the wall thickness which, when viewed in cross section, may extend over the entire periphery of the hollow profile 10, but also only in segments of the cross section, as shown in FIG. 4.

Advantageously, when viewed over its longitudinal extension, a structural-frame strut 9 may also have a varying cross section, with it being possible for a larger or maximum cross section which decreases or minimizes towards the ends of the structural-frame strut 9 to be provided in particular in a central portion 9m of the structural-frame strut 9. As a result, a greater buckling resistance can be achieved in the central portion 9m, and this is advantageous in particular when using the structural-frame strut 9 as a pressure rod. If the structural-frame strut 9 is subjected to bending stress, higher bending stresses can be resisted in an improved manner by such a cross-sectional dimension that increases towards the center of the strut.

Alternatively or additionally to such a change in diameter, the structural frame element may also have a wall thickness that changes over the length, as shown by the view (d), which also shows that the structural-frame strut 9 may be formed as a hollow profile 10. In particular, the wall thickness of the hollow-profile portion may increase towards the center of a strut and/or decrease towards the ends of a strut, with it optionally being possible to even provide another thickened portion of the wall at the ends of the strut, in order to provide improved resistance to forces to be introduced and/or connecting means to be fastened there.

Figure 6:
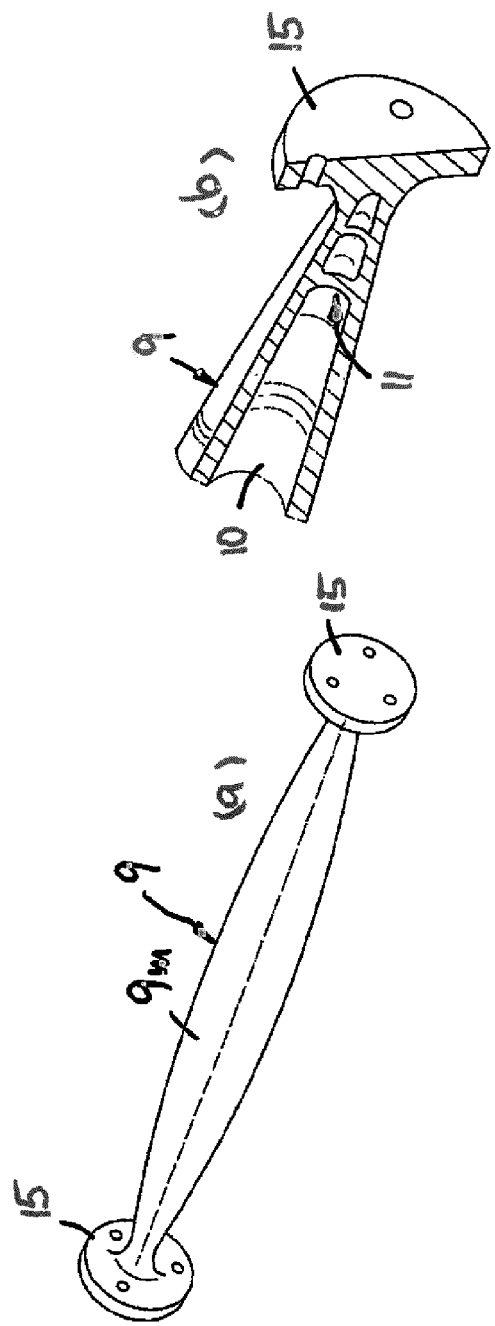
FIG. 6 is a perspective view of a structural-frame strut in the form of a pressure rod comprising molded-on fastening flanges at the ends of the rod, with the view (a) being a perspective outer view and the view (b) being a partial sectional view for showing the stiffening ribs provided inside the hollow profile and the molded-on solid-material cross section of the fastening flange.

As shown in FIG. 6, connecting portions 15, which may for example be in the form of connecting flanges, may be molded directly onto the end portions of the structural-frame strut 9, with it being possible for said connecting portions 15 to be in the form of the end flange as a solid-material body, while the strut body may otherwise be designed as a hollow profile 10.

Irrespective thereof, inner reinforcement portions 11 in the form of transverse stiffening walls may be provided in a hollow-profile portion 10 of the structural frame element 9; cf. FIG. 8, view (b).

As shown in FIG. 7, a structural-frame strut 9 may also comprise an integrally molded-on, seam-free screw-joint portion 18, which can likewise be constructed in layers in said manner, in particular produced using 3D printing. In this case, the threaded portion 18 may be designed as an external thread and/or an internal thread.

As shown in FIG. 8, a plurality of structural-frame struts 9, for example in the form of a longitudinal flange and a plurality of cross members, may be interconnected at a truss node of the truss 8, with it being possible for said plurality of structural-frame struts 9 to be integrally interconnected in a seam-free manner and so as to be made of homogeneous material, for example by producing the node point and the associated strut portions using 3D printing.

In this case, the interconnected truss struts 9 may be designed as a hollow profile 10 at least in part and/or at least in portions.

Alternatively or additionally, said structural-frame struts 9 may be reinforced in the region of the node point by means of a reinforcement portion 11, which reinforcement portion 11 can advantageously be arranged inside the hollow profile 10.

As shown in FIG. 8, view (e), the reinforcement portion 11 may comprise a honeycomb structure 13, which can bring about a significant increase in strength while still providing a light construction.

Alternatively or additionally to such a honeycomb structure 13, the reinforcement portion 11 may also comprise a tubular-bone structure 17, in which a plurality of tubes extend beside one another and may be integrally interconnected; cf. view (f) in FIG. 8.

Alternatively or additionally, the reinforcement portion 11 may also comprise a branched structure 13, in which a plurality of branching struts extend in different, three-dimensionally oriented longitudinal extensions and form a birds-nest type of reinforcement structure. In this case, the branching struts of the branched structure 13 may comprise a straight or curved/arcuate longitudinal extension, with the branching struts advantageously being integrally interconnected; cf. view (g) in FIG. 8.

Figure 9:
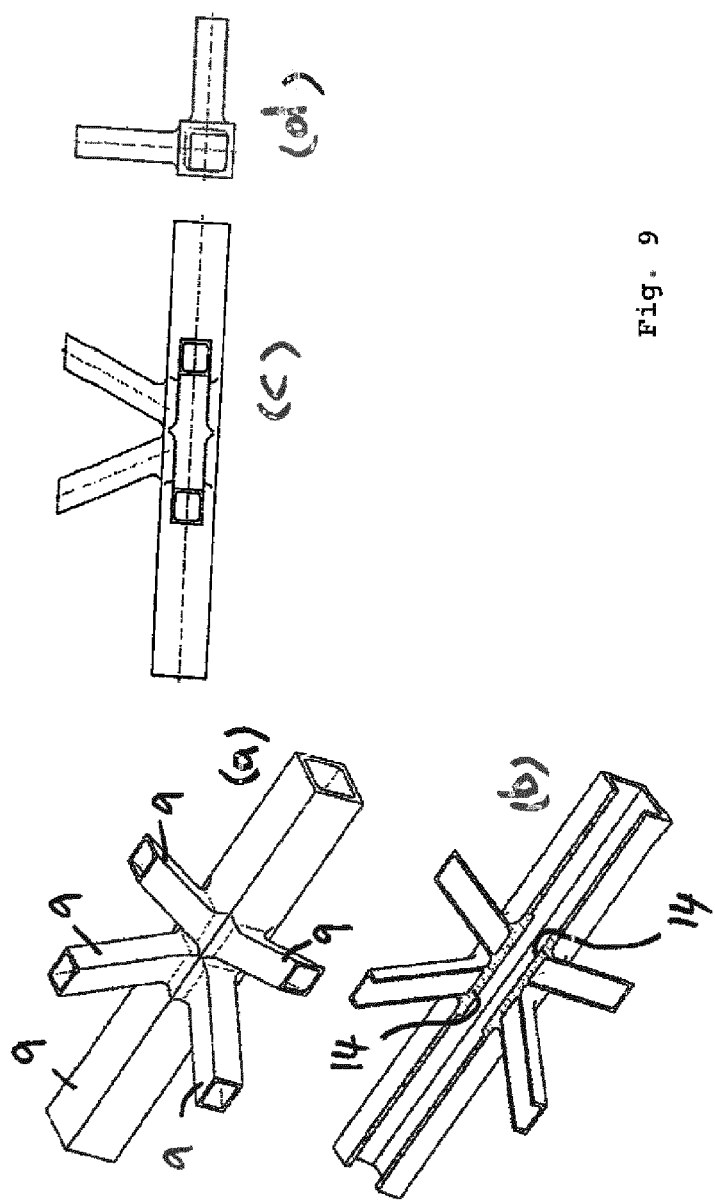
FIG. 9 is a perspective view of a node point of the structural truss frame of the crane from FIG. 1, in which the wall thicknesses of the hollow profile are partially thickened in the region of the connection points of the truss struts, with the view (a) being an outer view, the view (b) being a section view for illustrating the thickened portion in the wall thickness in the connecting region, the view (c) being a side view and the view (d) being a cross section.

As shown in FIG. 9, alternatively or additionally to such internal structures, the reinforcement portion 11 may also comprise thickened wall portions 14, in particular in the region of the interconnection of a plurality of truss struts 9. In particular, a hollow profile may comprise a thickened portion 14 in the wall thickness in the region of the node point between different structural-frame struts 9, which thickened portion may have a smooth, in particular gradual transition to the comparatively thinner wall thickness of the adjoining strut portions.

The invention claimed is:

1. A structural frame of a crane, a lifting device, a material handler or a machine, comprising:
   a lattice structure comprising longitudinal struts and cross-struts in the form of elongate structural-frame struts, wherein the elongate structural-frame struts comprise a hollow profile and are connected to each other at node points of the lattice structure, wherein at least one of the node points of the lattice structure is formed layer by layer with a first metal material and connects a plurality of the elongate structural-frame struts of the lattice structure integrally in one piece and in a seamless manner, wherein an elongate structural-frame strut of the elongate structural-frame struts comprises a reinforcement portion in a region of at least one of the at least one of the node points, wherein the reinforcement portion has a thickened portion with an increased wall thickness and/or an increased cross section, wherein the reinforcement portion is integrally formed in one piece with the elongate structural-frame strut layer by layer with the first metal material and/or with a second metal material, and wherein a continuous step-free and seamless transition is between the thickened portion and an adjacent structural frame portion having a thinner wall thickness and/or a smaller cross section.

2. The structural frame of claim 1, wherein the reinforcement portion is integrally molded onto the inside or outside of the hollow profile of the elongate structural-frame strut.

3. The structural frame of claim 1, wherein a region of the reinforcement portion has a freeform element having a continuously and constantly changing wall thickness.

4. The structural frame of claim 2, wherein the reinforcement portion comprises a honeycomb structure or tubular-bone structure inside the hollow profile.

5. The structural frame of claim 1, wherein the reinforcement portion comprises a branched structure inside the hollow profile and irregularly shaped and/or three-dimensionally arranged branched struts extending in different directions.

6. The structural frame of claim 5, wherein the branched struts have a wall thickness that changes gradually over the longitudinal extension of the branched struts and/or the branched struts have a cross-sectional dimension that changes gradually over the longitudinal extension of the branched struts.

7. The structural frame of claim 1, wherein at least one of the elongate structural-frame struts comprises two connecting portions for connection to other structural frame elements at opposite ends, wherein at least one of the elongate structural-frame struts has a cross section that continuously and constantly changes gradually and/or a wall thickness that continuously and constantly changes gradually at least in a central portion between the two connecting portions, and wherein the cross-sectional dimension and/or the wall thickness has a maximum in the central portion and/or is decreasing from the central portion towards opposite sides and/or increasing again at the two connecting portions.

8. The structural frame of claim 1, wherein when viewed in cross section, at least one of the elongate structural-frame struts has a wall thickness that changes in a peripheral direction, and gradually increases and gradually decreases again in the peripheral direction.

9. The structural frame of claim 8, wherein when viewed in a longitudinal section, at least one of the elongate structural-frame struts has a changing wall thickness which gradually increases and gradually decreases again.

10. The structural frame of claim 1, wherein the region of at least one of the node points comprises a region in which a plurality of the elongate structural-frame struts are interconnected.

11. The structural frame of claim 10, wherein the at least one of the node points of the lattice structure is formed layer by layer has a layered metal material construction from the use of 3D printing.

12. The structural frame of claim 1, wherein at least one of the elongate structural-frame struts has a longitudinal axis having a curved progression and a wall thickness that changes multiple times over the longitudinal axis and/or a cross-sectional dimension that changes multiple times over the longitudinal axis.

13. The structural frame of claim 1, wherein at least one of the elongate structural-frame struts forms an elongate girder comprising a structural-frame enveloping surface at least in portions, which, when viewed in a longitudinal section, has a curved enveloping-surface sectional contour.

14. The structural frame of claim 13, wherein the structural frame enveloping surface, when viewed in cross section, has a curved enveloping-surface sectional contour that is not circular.

15. The structural frame of claim 13, wherein the curved enveloping-surface sectional contour is elliptical or oval or droplet-shaped when viewed in cross section.

16. The structural frame of claim 15, wherein the curved enveloping-surface sectional contour viewed in cross section changes in different cross sections that are spaced apart along the longitudinal extension of the at least one of the elongate structural-frame struts.

17. The structural frame of claim 1, wherein the elongate structural-frame struts comprise a solid-material profile.

18. The structural frame of claim 1, wherein the elongate structural-frame struts comprise a plurality of metal layers integrally interconnected in a planar manner.

19. The structural frame of claim 1, wherein the reinforcement portion comprises layers of the first metal material, and further comprising structural-frame portions spaced apart from the reinforcement portion, wherein the structural-frame portions comprise layers of the second metal material of a lower strength than the first metal material.

20. The structural frame of claim 19, wherein a single material layer comprises a first layer portion made of the first metal material and a second layer portion made of the second metal material.

21. The structural frame of claim 1, wherein the elongate structural-frame struts comprise a plurality of layers and partially changes material properties within one layer, and wherein a first layer has a high material strength and a second layer has a low material strength.

22. The structural frame of claim 1, wherein strut portions having different material properties are provided in the cross section or longitudinal section of the elongate structural-frame struts.

23. The structural frame of claim 1, wherein the elongate structural-frame struts are produced in portions by 3D printing.

24. A machine comprising the structural frame of claim 23.

25. The machine of claim 24, wherein the machine comprises a crane, a lifting device, a material handler, a cable excavator or a construction machine.

26. A tower crane comprising the structural frame of claim 1.

* * * * *